(No Model.)
J. HURLEY.
THILL SUPPORT.
No. 528,102.          Patented Oct. 23, 1894.
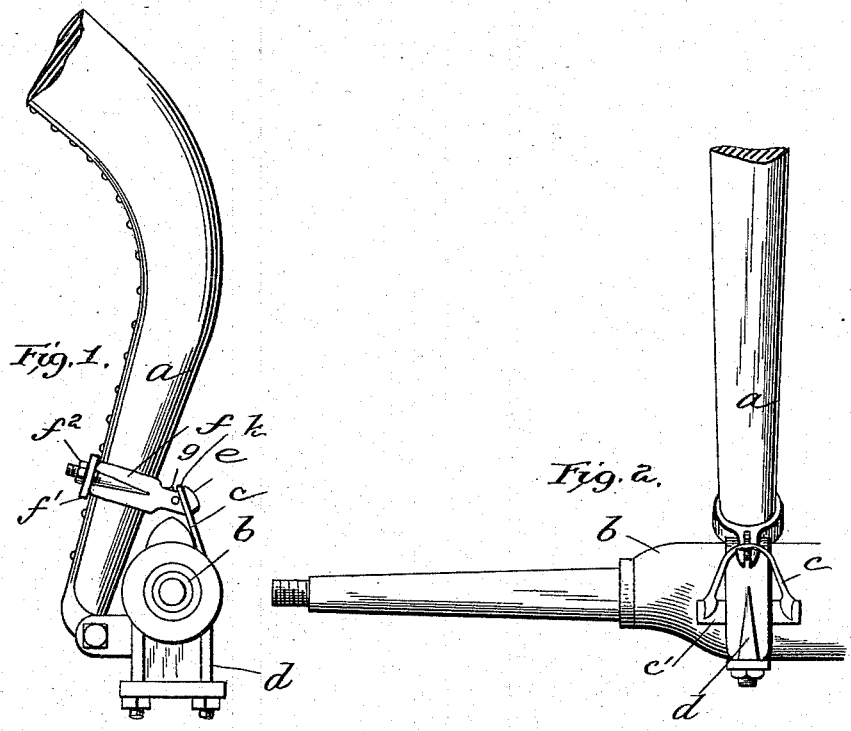
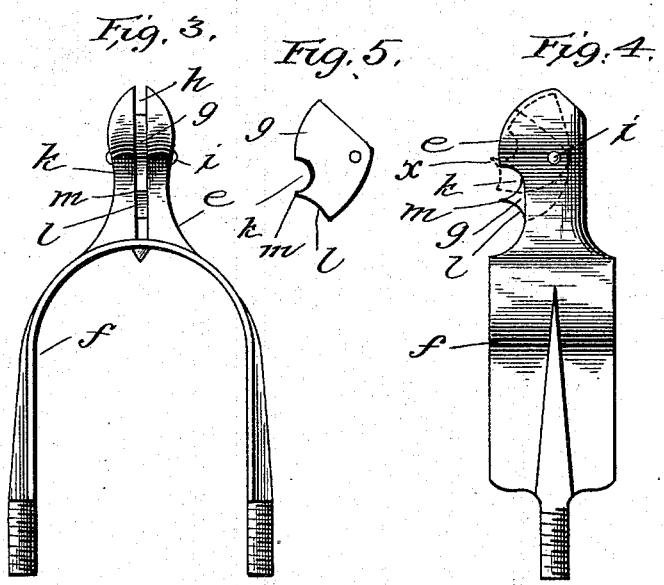
Attest:
Walter N. Maldson
Wm. T. Hall
Inventor
Jere Hurley
by Ellis Spear
Atty.

UNITED STATES PATENT OFFICE.

JERE HURLEY, OF ELLSWORTH, MAINE.

THILL-SUPPORT.

SPECIFICATION forming part of Letters Patent No. 528,102, dated October 23, 1894.

Application filed March 7, 1894. Serial No. 502,733. (No model.)

*To all whom it may concern:*

Be it known that I, JERE HURLEY, a citizen of the United States of America, residing at Ellsworth, in the county of Hancock and State of Maine, have invented certain new and useful Improvements in Shaft-Supports, of which the following is a specification.

My invention relates to improvements in vehicle shaft supports and the object of the invention is to provide a device which may be readily attached to any vehicle to automatically engage and retain the shafts in an elevated position and which may be automatically disengaged by merely lifting the shafts slightly above their suspended position.

The invention consists broadly of a catch secured to the axle of the vehicle or in analogous position in proximity to the shaft and a hook carried by the shaft adapted to engage with said catch when the shaft is lifted, the catch carrying a trip operating to disengage the catch and hook when the shafts are raised above their suspended position.

The invention also consists in the construction hereinafter described and particularly pointed out in the claim.

In the accompanying drawings which illustrate my invention, Figure 1, is a side view of a portion of vehicle shaft showing my invention applied thereto. Fig. 2, is a rear view of the same. Fig. 3, is a detail view of the hook. Fig. 4, is a view at right angles to Fig. 3. Fig. 5, is a detail of the trip.

In the drawings $a$ represents one of the shafts of a vehicle and $b$ the axle.

$c$ represents a spring loop or catch which is secured to the rear side of the axle by any suitable means, as for instance a plate $c'$ to which the ends of the loop are connected and which is held in place by the clip $d$ of the coupling. A bifurcated hook $e$ is adapted to be secured to the shaft in a position to be engaged by the spring loop or catch as the shaft is raised.

A simple manner of securing the hook to the shaft is by means of the clip $f$, the arms of which encircle the shaft and are confined in place by a plate $f'$ and nuts $f^2$. As before stated when the shafts are raised the loop slips over and engages with the hook, the ends of the hook being rounded or beveled to cause the loop to ride up onto the same and then drop behind the shoulder of the hook. In order to disengage the hook from the loop when it is desired to lower the shafts a trip plate $g$ is pivoted in the bifurcation $h$ of the hook, upon a pivot pin $i$. This trip plate has a recess $k$ corresponding in shape to the recess formed by the shoulder of the hook into which the loop drops. A slight rounded depression $l$ is also formed in the edge of the plate, this being separated from the recess $k$ by a shoulder $m$ which projects slightly beyond the rounded edges of the hook. It will thus be seen that as the shaft is raised and the loop rides over the rounded edge of the hook it will engage and push the shoulder $m$ before it until the recess $k$ in the said shoulder coincides with the recess formed by the shoulders of the hook when the loop will at once drop into place and be held by the said hook thus retaining the shafts in an elevated position.

The position of the trip plate when the shafts are suspended by the hook is shown clearly by full lines in Fig. 4. When, however, it is desired to lower the shafts, it is only necessary to raise them a trifle higher, and as farther backward movement of the trip plate is prevented by the edge of the said plate bearing against the end of the recess the loop will be forced up over the shoulder $m$ into the depression $l$ and when the shafts are again lowered the loop will carry with it the trip plate which will lift it clear of the shoulder of the hook and drop it onto the rounded edge at the point $x$ indicated by dotted lines in Fig. 4.

Having thus described my invention, what I claim is—

In a shaft support a bifurcated hook on the shaft, having a rounded edge and engaging shoulders, a trip plate pivoted in the bifurcation, said trip plate having a recessed portion $k$, corresponding to the engaging shoulders, a shoulder $m$ projecting beyond the rounded edge, and a shallow depression in rear of said shoulder, in combination with a loop secured to the axle and adapted to bear against said projecting shoulder $m$, and to rest behind the engaging shoulders said trip plate having a limited backward movement whereby the elevation of the shafts above their suspended position will cause the loop to override the shoulder $m$, and rest in the shallow depression, substantially as described.

In testimony whereof I affix my signature in presence of two witnesses.

JERE HURLEY.

Witnesses:
SAMUEL J. MORRISON,
HENRY J. JOY.